(12) United States Patent
Coutandin et al.

(10) Patent No.: US 9,188,008 B2
(45) Date of Patent: Nov. 17, 2015

(54) GAS TURBINE FOR AERONAUTIC ENGINES

(75) Inventors: Daniele Coutandin, Turin (IT);
Massimiliano Albani, Volvera (IT)

(73) Assignee: Avio S.p.A., Turin (IT)

( * ) Notice: Subject to any disclaimer, the term of this patent is extended or adjusted under 35 U.S.C. 154(b) by 727 days.

(21) Appl. No.: 13/332,640

(22) Filed: Dec. 21, 2011

(65) Prior Publication Data
US 2012/0328414 A1 Dec. 27, 2012

(30) Foreign Application Priority Data
Dec. 21, 2010 (IT) .............................. TO2010A1035

(51) Int. Cl.
*F01D 5/08* (2006.01)
*F01D 11/00* (2006.01)

(52) U.S. Cl.
CPC .............. *F01D 5/081* (2013.01); *F01D 11/001* (2013.01); *Y02T 50/676* (2013.01)

(58) Field of Classification Search
CPC ........... F01D 5/08; F01D 5/081; F01D 5/082; F01D 5/084; F01D 5/085; F01D 5/087; F01D 5/088; F05D 2240/15
USPC ................ 415/115, 116, 173.7, 174.4, 174.5; 416/95, 96 R, 96 A, 97 A, 97 R, 198 A, 416/201 R
See application file for complete search history.

(56) References Cited

U.S. PATENT DOCUMENTS

| | | | | |
|---|---|---|---|---|
| 4,730,982 A | * | 3/1988 | Kervistin | 416/95 |
| 5,232,339 A | * | 8/1993 | Plemmons et al. | 415/178 |
| 5,429,478 A | * | 7/1995 | Krizan et al. | 415/173.7 |
| 6,655,920 B2 | * | 12/2003 | Beutin et al. | 416/198 A |
| 8,662,835 B2 | * | 3/2014 | Fachat et al. | 415/173.5 |
| 2002/0187046 A1 | | 12/2002 | Beutin et al. | |

FOREIGN PATENT DOCUMENTS

| | | |
|---|---|---|
| EP | 0250323 | 12/1987 |
| JP | 59-194002 | 11/1984 |

OTHER PUBLICATIONS

IT Appln. No. TO2010A001035—Jul. 5, 2011 Italian Search Report.

* cited by examiner

*Primary Examiner* — Nathaniel Wiehe
*Assistant Examiner* — Brian O Peters
(74) *Attorney, Agent, or Firm* — Davidson Berquist Jackson & Gowdey LLP

(57) ABSTRACT

In a turbine for aeronautic engines, a first and at least a second turbine disk rotating around a common axis respectively carrying a first and a second moving-blade crown, with which first and, respectively, second axial passages are defined through which a cooling air mass for the turbine disks can pass, a device for conveying cooling air being interposed between the first and the second axial passages to receive the mass of air passing through the first axial passages and send it through the second axial passages.

14 Claims, 1 Drawing Sheet

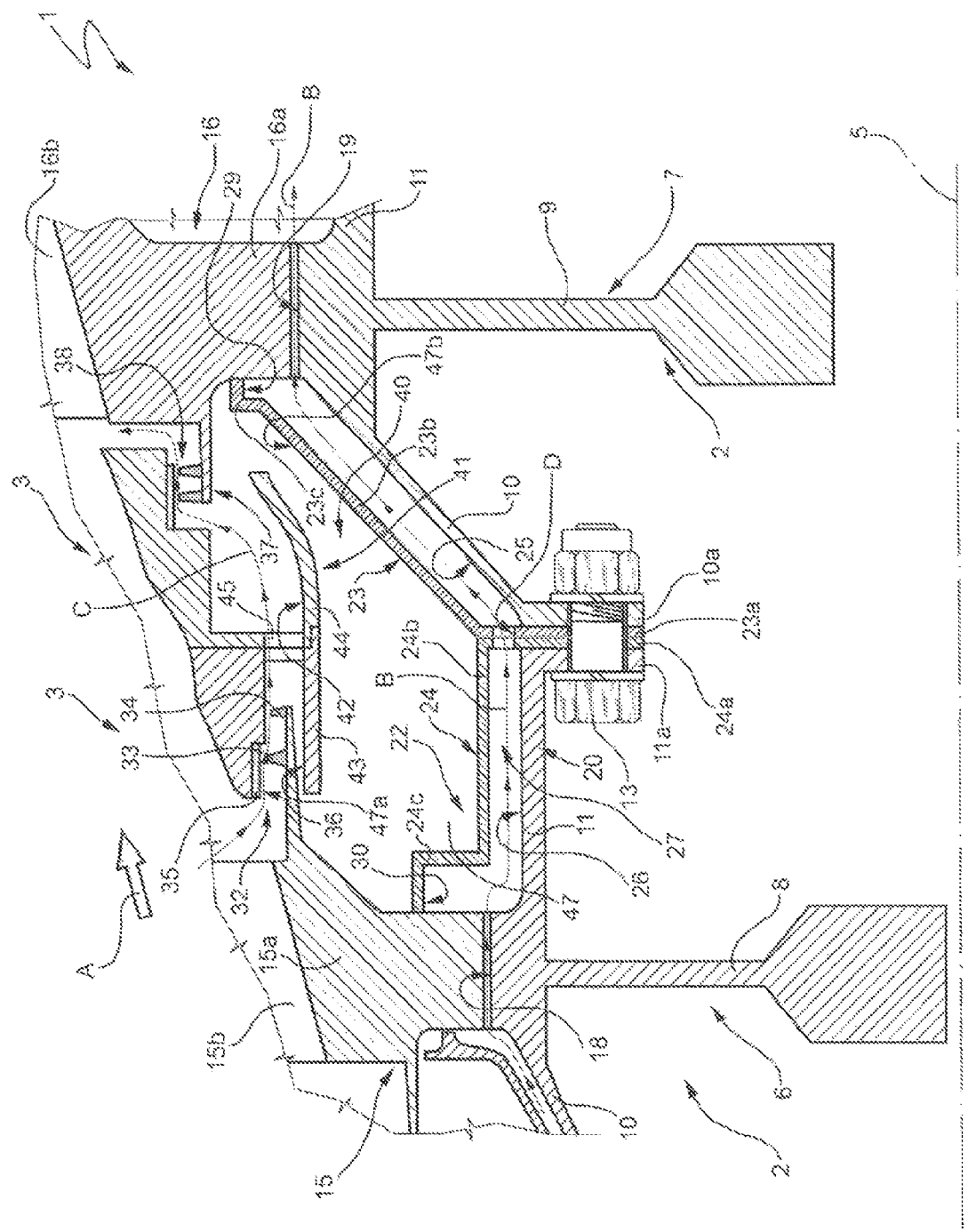

GAS TURBINE FOR AERONAUTIC ENGINES

The present invention relates to a gas turbine for aeronautic engines.

BACKGROUND OF THE INVENTION

As is known, a gas turbine for aeronautic engines generally comprises a number of rotating bladed sectors, each of which, in turn, comprises a turbine disk connected to adjacent turbine disks and carrying a coupled blade crown.

As is also known, turbine disks are components that are subjected to high stress, both mechanical, due to the effect of centrifugal components and, above all, thermal, since they operate in an extremely high temperature environment due to close vicinity with the flow of hot gases that impact the blades. For optimal turbine operation it therefore becomes necessary to control the operating temperature of these disks, maintaining the operating temperature below a set or critical threshold value.

To that end, it is known to send to each of the turbine disks its own cooling airflow, separate from the other cooling airflows. Each cooling airflow is normally formed by bleeding a predetermined quantity of air from the compressor and conveying the bled air to the area of connection of the blades to the respective turbine disk. In the area of connection of the blades to the disk, the air is made to flow through passages, each one being defined on one side by a slot in the turbine disk to be cooled and by the leading portion or lobe of the relevant blade, on the other. While traversing the passages, the cooling air progressively heats up, carrying away heat by convection; at the exit, the heated air is first fed into a mixing chamber where it mixes with part of the mentioned flow of hot gases, forming a mixture of lower temperature that passes over the side walls of the blade and the turbine disk, after which the same mixture is reinserted in the flow of hot gases before this flow passes over the bladed sector arranged downstream of the cooled turbine disk.

Although it is used, for various reasons, the described cooling method is found to be less than satisfactory.

First of all, cooling of the disks is performed in conditions of low efficiency and therefore the cooling capacity of the incoming air is only exploited in part. In consequence, the air exiting from the respective turbine disks has a relatively low temperature for which, when mixed with the hot gases entering the downstream stage, it significantly lowers the temperature of the hot gases in an undesired manner.

With bleeding being carried out for each turbine disk, as the number of turbine disks increases, so does the quantity of air that is used and the overall efficiency consequently decreases.

SUMMARY OF THE INVENTION

The object of the present invention is that of making a gas turbine for aeronautic engines, the embodying characteristics of which enable the above described problems to be resolved in a simple and inexpensive manner.

According to the present invention a gas turbine for aeronautic engines is produced comprising a first and at least a second rotating bladed sector respectively comprising a first and a second turbine disk arranged coaxially to an axis of the turbine and respectively carrying a coupled first and second moving-blade crown, the first and the second turbine disk defining with the respective blades first and, respectively, second passages through which a cooling air mass for said turbine disks can pass, characterized in that it further comprises means for conveying said cooling air interposed between said first and second bladed sector to convey the cooling air exiting said first passages towards said second passages.

BRIEF DESCRIPTION OF THE DRAWING

The invention will now be described with reference to the attached FIGURE, which partially illustrate a preferred non-limitative embodiment of a gas turbine for aeronautic engines made according to the principles of the present invention.

DETAILED DESCRIPTION OF THE INVENTION

In the attached FIGURE, reference numeral 1 indicates, as a whole, a gas turbine for an aeronautic engine (not shown). The turbine 1 comprises a plurality of rotating bladed sectors 2, only two of which are visible in the attached FIGURE and a plurality of stator bodies 3 only two of which are visible in the attached FIGURE, arranged between the two bladed sectors 2.

The rotating bladed sectors 2 extend coaxially to a turbine axis, indicated by reference numeral 5, and respectively comprise turbine disks 6 and 7, rotating around axis 5 and, in turn, each comprising a respective disk-like central portion 8 and 9 and, for each disk-like central portion, an associated pair of lateral, internally-flanged tubular bodies 10 and 11.

The lateral tubular bodies 10 and 11 integrally protrude from the associated disk-like central portion 8 and 9 in opposite directions and terminate with respective inner flanges 10a and 11a stably connected to one another by a ring of screws 13, only one of which is visible in the attached FIGURE.

The turbine disks 6 and 7 carry respective blade crowns, respectively indicated by reference numerals 15 and 16 and coupled in a known manner, which in turn comprise respective roots 15a and 16a stably coupled to the associated disk-like central portion 8 and 9 and associated outer shaped portions 15b and 16b over which a functional flow A of hot gases passes during use.

Each root 15a is housed in an associated seat made on the outer perimeter of the disk-like central portion 8 and, with the associated seat, defines a respective through opening or axial passage 18, parallel to axis 5 in the described example. According to a variant that is not shown, the axial passage 18 is inclined with respect to axis 5.

Each root 16a is instead housed in an associated seat made on the inner perimeter of the disk-like central portion 9 and, with the associated seat, defines a further through opening or axial passage 19, always parallel to axis 5.

Always with reference to the attached FIGURE, the passages 18 and 19 constitute part of a closed circulation circuit 20 of a cooling airflow for the turbine disks 6 and 7. In addition to the passages 18 and 19, the circuit 20 comprises a conveying device 22 to receive the cooling air mass exiting passages 18 and convey this mass of air to the inlet of and through passages 19.

In the particular example described, the device 22 comprises two shaped annular bodies, indicated with reference numerals 23 and 24, which respectively surround portion 10 and portion 11 and have respective inner flanges 23a and 24a arranged in contact with each other and tightened in a pack between flanges 10a and 11a by screws 13. The annular bodies 23 and 24 comprise respective intermediate portions 23b and 24b with a rectilinear generatrix, which extend from the associated inner flanges 23a and 24a to the respective blade crowns and, with portions 10 and 11, define two sections 25 and 26 of a duct 27. Sections 25 and 26 communicate with each other through a crown of openings D made through flanges 23a and 24a.

Finally, always with reference to the attached FIGURE, the annular bodies 23 and 24 comprise respective terminal portions 23c and 24c that, in the particular example described, have inner diameters greater than those of the intermediate portions 23b and 24b, are coupled in a substantially fluid-tight manner to the associated blade crowns 16 and 15 and, together with blade crowns 16 and 15 and the associated turbine disk 7 and 8, define respective chambers 29 and 30. Chambers 29 and 30 constitute part of circuit 20 and communicate with the associated sections 25 and 26 of duct 27 on one side and with the respective openings 19 and 18 on the other. In this way, cooling air passing through the openings 18 is collected in chamber 30 and from here sent through duct 27 to chamber 29; this air proceeds from chamber 29, passing through passages 19, in this way also cooling turbine disk 7.

Still with reference to the attached FIGURE, each portion 15b is coupled to an adjacent stator body 3 by means of a respective controlled-leakage seal 32. In the particular example described, the seal 32 comprises a pair of annular fins 33 and 34, which are carried by portion 15b and in which fin 33 cooperates with a body 35 of abradable material carried by the stator body 3, while fin 34 cooperates directly with an inner surface of the stator body 3. In normal running conditions, fins 33 and 34 define a passage 36 through which a precise part C of the flow A of hot gases is drawn.

In the described example, each portion 16b is instead coupled to the adjacent stator body 3 by means of an associated seal 37, which is similar to seal 32 and defines a reinjection passage 38 for the bled part C of the hot gas back into the flow A of hot gases.

The cooling air for the turbine disks 6 and 7 transiting inside circuit 20 is insulated from flow A of hot gases, but above all from part C bled through seal 32, by a heat barrier, indicated as a whole by reference numeral 40.

The heat barrier 40 comprises a mechanical guide barrier 41 stably connected to the stator bodies 3 and defining with these stator bodies 3 an additional annular feed duct 42, which is able to receive part C of the hot gas exiting seal 32 and convey this part C of hot gas to seal 38, which permits its reinjection into flow A of hot gases.

Always regarding the particular example described, duct 42 houses the seals 32 and 38 inside its axially ending terminal sections, of different volumes, while the mechanical barrier 41 comprises two annular metal bodies 43 and 44, which are coupled to each other in a fluid-tight manner and protrude in axially opposite directions from a perforated support appendage 45 obtained near the junction area of the turbine disks 6 and 7.

In addition to the mechanical barrier 41, the heat barrier 40 also comprises an annular chamber 47 arranged between duct 42 for conveying part C of the bled hot gas and duct 27 for conveying the cooling air. Chamber 47 is circumferentially delimited by bodies 43 and 44 on the outer side and by bodies 23 and 24 on the inner side and communicates with an inlet and with an outlet of duct 42 through two throttled passages, indicated by reference numerals 47a and 47b. In use, chamber 47 houses a mass of air that, due to the shape of passages 47a and 47b, in practice can only move in the circumferential direction and thus defines a thermally insulating cushion that separates the hot flows A and C from the flow B of cooling air, preventing the latter from being heated up during transit from one turbine disk to the next.

First of all, from the foregoing it is evident that in the described turbine 1 a single cooling airflow common to all the turbine disks 6 and 7 is used. In fact, each circuit 20 enables taking the cooling air exiting an upstream turbine disk and sending it to a turbine disk arranged immediately downstream. In this way, always with respect to known solutions, the mass of air destined to cooling the turbine disks is significantly reduced.

The same cooling air is never mixed or added to the flow of hot gases and therefore the temperature of these hot gases is not affected by the mass and temperature of the cooling air.

Furthermore, in order to avoid undesired heating of the air during transfer from one turbine disk to the next, a thermally insulating barrier is provided in the described turbine 1 that, in the particular example described, comprises a mechanical barrier, with the function of reinjecting the bled hot gases into the main flow again, and an insulating air cushion to thermally separate the mechanical barrier of the device provided to guide the cooling airflow through the various turbine disks.

From the foregoing, it is apparent that changes and modifications may be made to the turbine 1 described herein without leaving the scope of protection defined in the independent claims.

In particular, the device to guide the cooling air towards the axial passages of the downstream turbine disk could be constructively different from that described by way of example. In particular, the cooling air could advance along a defined path that is not closed due, for example, to possible bleeding in the interface area between portions 23c and 24c and blades 15 and 16.

The invention claimed is:

1. A gas turbine for aeronautic engines comprising a first and at least a second rotating bladed sector comprising respectively a first and a second turbine disk arranged coaxially to an axis of the turbine and respectively carrying a coupled first and second moving-blade crown, the first and the second turbine disk defining with associated blades first and second passages through which a cooling air mass for said turbine disks can pass, a cooling air passageway conveying cooling air to the first and second passages with the cooling air exiting the first passages and flowing towards the second passages, first and second stator bodies interposed between said first and second moving blade crowns, a first seal interposed between the first moving blade crown and said first stator bodies and a second seal interposed between said second stator bodies and said second blade crowns, and a thermally insulating chamber insulating a hot gas flows from the cooling air passageway, said thermal insulating chamber comprising a mechanical barrier stably connected to said stator bodies and defining with the stator bodies an annular duct to convey a bled flow of hot gas exiting through said first seal towards said second seal.

2. The turbine according to claim 1, wherein said second seal defines a reinjection passage of said bled hot gas flow conveyed by said bled flow duct into said hot gas flow.

3. The turbine according to claim 1, wherein said annular duct partially houses said first and second seals.

4. The turbine according to claim 3, wherein said bled flow duct is spaced in a radial direction from said cooling air passageway.

5. The turbine according to claim 1, wherein said mechanical barrier comprises two metal bodies protruding in axially opposite directions from a support appendage obtained near the junction area of said first and second turbine disk.

6. The turbine according to claim 1, wherein said thermally insulating chamber comprises an annular insulation chamber arranged between said annular duct and said cooling air passageway, said annular insulation chamber housing an insulating air cushion.

7. The turbine according to claim 6, wherein said annular insulation chamber communicates with an inlet and with an outlet of said annular duct through respective throttled passages.

8. A gas turbine for aeronautic engines comprising a plurality of rotating bladed sectors with a like plurality of turbine disks arranged coaxially relative to an axis of the turbine and respectively carrying moving blade crowns, the plurality of turbine disks defining with the associated blades a plurality of passages through which a cooling air mass for the turbine disks can pass, a cooling air passageway conveying cooling air through the plurality of turbine disk passageways between adjacent turbine disks, a plurality of stator bodies respectively interposed between the moving-blade crowns, a plurality of sets of first and second seals interposed between and spaced apart adjacent each moving blade crown and each stator body, and a thermally insulating chamber insulating a hot gas flow from the cooling air passageway and including a mechanical barrier stably connected to said plurality of stator bodies and defining therewith an annular duct to convey a bled flow of hot gas between each of the plurality of sets of first and second seals with the flow in each set being from the first seal towards the second seal.

9. The turbine according to claim 8, wherein said second seal defines a reinjection passage of said bled hot gas flow conveyed by said bled flow duct into said hot gas flow.

10. The turbine according to claim 8, wherein said annular duct partially houses said first and second seals.

11. The turbine according to claim 10, wherein said annular duct is spaced in a radial direction from said cooling air passageway.

12. The turbine according to claim 8, wherein said mechanical barrier comprises two metal bodies protruding in axially opposite directions from a support appendage obtained near the junction area of said first and second turbine disk.

13. The turbine according to claim 8, wherein said thermally insulating chamber comprises an annular insulation chamber arranged between said annular duct and said cooling air passageway, said annular insulation chamber housing an insulating air cushion.

14. The turbine according to claim 8, wherein said annular insulation chamber communicates with an inlet and with an outlet of said annular duct through respective throttled passages.

\* \* \* \* \*